(12) United States Patent
Des Roches et al.

(10) Patent No.: US 8,235,669 B2
(45) Date of Patent: Aug. 7, 2012

(54) AXIAL FLOW HYDRAULIC TURBINE WITH BLADE MOUNTING

(75) Inventors: Benoit Des Roches, Quebec (CA); Vincent Francou, Quebec (CA); Christine Monette, Quebec (CA); Eric Ferland, Quebec (CA)

(73) Assignee: Andritz Technology and Asset Management GmbH, Graz (AT)

( * ) Notice: Subject to any disclaimer, the term of this patent is extended or adjusted under 35 U.S.C. 154(b) by 1149 days.

(21) Appl. No.: 12/051,940

(22) Filed: Mar. 20, 2008

(65) Prior Publication Data

US 2009/0092496 A1   Apr. 9, 2009

(30) Foreign Application Priority Data

Oct. 5, 2007 (CA) ...................................... 2605817

(51) Int. Cl.
*F03B 3/00* (2006.01)
(52) U.S. Cl. .................................................. 416/219 R
(58) Field of Classification Search .............. 416/204 R, 416/205, 207, 220 A, 219 A, 239, 244 R, 416/246, 248, 158, 2, 210 R, 245 A, 245 B, 416/215, 220 R See application file for complete search history.

(56) References Cited

U.S. PATENT DOCUMENTS

| | | | |
|---|---|---|---|
| 2,368,656 A * | 2/1945 | Gaskell et al. ............ | 416/214 R |
| 2,751,189 A * | 6/1956 | Ledwith ........................ | 416/217 |
| 2,983,320 A * | 5/1961 | Uhrich et al. ................. | 416/205 |
| 3,470,843 A * | 10/1969 | Satterthwaite et al. ......... | 440/49 |
| 3,557,744 A * | 1/1971 | Herbert ........................... | 440/79 |
| 4,012,170 A | 3/1977 | Grubb | |
| 4,256,435 A * | 3/1981 | Eckel .......................... | 415/209.1 |
| 4,449,939 A * | 5/1984 | Matteson ........................ | 434/12 |
| 5,611,665 A * | 3/1997 | Angel ................................ | 416/1 |
| 5,997,253 A * | 12/1999 | Feehan ......................... | 416/207 |
| 6,247,893 B1 | 6/2001 | Beyer et al. | |
| 2010/0104443 A1 * | 4/2010 | Pentony .................... | 416/219 A |

* cited by examiner

*Primary Examiner* — Edward Look
*Assistant Examiner* — Christopher R Legendre
(74) *Attorney, Agent, or Firm* — Nixon & Vanderhye P.C.

(57) ABSTRACT

A hydraulic turbine has a runner blade fixedly mounted to a runner hub. The runner blade has a mounting flange having a generally rectangular shape held in contact with a complementary generally rectangular shaped outside surface portion of the runner hub. The complementary rectangular shapes increases surface contact area between the blade mounting flange and the hub over that of circular shaped flanges and thereby reduces the stress levels between the blade flange and the hub. Further, the surface contact area between the blade mounting flange and the blade root is increased to thereby reduce the stress level in the blade root fillets.

12 Claims, 4 Drawing Sheets

AXIAL FLOW HYDRAULIC TURBINE WITH BLADE MOUNTING

RELATED APPLICATION

The subject application is related to the co-pending U.S. application Ser. No. 12/051,944 filed concurrently herewith for "Axial Flow Hydraulic Turbine with Blade Mounting" for the same inventors and assignee as herein.

FIELD OF THE INVENTION

The present invention relates to axial flow hydraulic turbines known as fixed blade propeller and diagonal turbines assembled by attaching flanges of the blades in a fixed manner to a hub of the turbine. In particular, it relates to increasing the surface area of the blade flange connection to both the hub and the root of the blade.

BACKGROUND OF THE INVENTION

In the manufacture of hydraulic machine runners for turbines, it is known to bolt the runner blades of the turbine onto the runner hub of the turbine with fitted studs and nuts. Typically the hub is hollow and has a non-planar outer surface that is conical, cylindrical or spherical in shape. The blade is provided with a circular shaped flange which is bolted to the outer surface of the runner hub by a series of studs and nuts arranged in a single circle that pass through the runner hub and into the flange of the runner blade. The bolted connection allows for an easy adjustment of the blade angle to meet homology requirements during the assembly of the hydraulic machine and reduces runner size for transportation as the blades are not welded in place and can be removed.

In some hydraulic turbine assemblies, space limitations within the runner hub prevent a sufficient number of bolting connections, arranged in the single circular pattern on a circular flange, to pass through the hub and into the circular flange. As a result it may not be possible to ensure proper fatigue life of the bolting by flange pre-loading. Further, when the space limitations result in the flange having a smaller diameter than desired, stress levels in the flange can rise over acceptable limits. In these instances the runners are usually assembled without the use of bolting and by welding the runner blades to the runner hub or with the use of segmented casting that is united with shrink rings or welding.

Clearly, any improvements to the connection between the runner hub and the runner blade flange which reduce stress levels would be desirable.

BRIEF DESCRIPTION OF THE INVENTION

The present invention relates to the use of a generally rectangular shaped mounting flange on a runner blade of a hydraulic turbine formatting to a turbine hub that provides more surface area than a circular flange so that a larger connection surface area between the flange and the hub is achieved. It is contemplated within the realm of the present invention that the blades may be attached to the hub by fastening means such as, for example, welding and, preferably, bolted connections.

The increased surface area associated with the rectangular shaped flange reduces the stress levels between the blade and the flange. Further, it also increases the area between the flange and the blade root to thereby reduce the stress level in the blade root fillets.

Where bolting connections are used, the additional surface area provided by rectangular shaped flanges ensures that total bolt clamp force may avoid surface separation between blade flange and hub in all operating conditions and improve fatigue life of the bolt connections. The bolting connections can be spread across the flange further from its center thereby improving bolt group inertia.

In one embodiment of the present invention there is provided an axial flow hydraulic turbine with fixed blade mounting comprising a plurality of runner blades. Each of the runner blades comprises a mounting flange comprising a planar hub abutting surface portion having a first generally rectangular shape. The turbine comprises a hub for supporting the runner blades. The hub comprises a non-planar outer surface having a plurality of recesses, one recess for each of the plurality of blades. Each of the recesses has a planar flange seating surface portion for seating a corresponding planar hub abutting surface portion of the mounting flange in contacting relation therewith. The turbine further comprises fastening means for attaching in fixed position each of the runner blades to the hub where each mounting flange meets the hub.

In one embodiment, the planar flange seating surface portion of each of the recesses is a second generally rectangular shape complementary to the first generally rectangular shape of the hub abutting surface portion. Further, the first and second generally rectangular shapes have a radius at corners thereof.

It should be understood that the planar hub abutting surface portion of the mounting flange presents the rectangular shape when viewed normal to this surface. Similarly the planar flange seating surface portion presents a rectangular shape when viewed normal to this surface. The surfaces may be vertically orientated or orientated at an angle to the vertical whereby surfaces that are angled with respect to the vertical appear trapezoidal in shape when viewed along a horizontal orientation.

In one embodiment the first and second generally rectangular shapes are square shapes.

In another embodiment, the plurality of recesses are machined into the non-planar outer surface of the hub and form a lip that at least partially surrounds each of the mounting flanges.

In another embodiment, the mounting flange comprises a plurality of threaded flange apertures extending from the planar hub abutting surface portion into the mounting flange. The plurality of threaded flange apertures are grouped and spread across the planar hub abutting surface portion in a first array like pattern. The hub is hollow and comprises a central opening. Each of the recesses has a flange seating surface portion for seating a corresponding planar hub abutting surface portion of the mounting flange. The recess has a plurality of hub apertures extending from the planar flange seating surface portion through the hollow hub and opening into the central opening. The plurality of hub apertures are grouped and spread across the planar flange seating surface portion in a second array like pattern. Each of the hub apertures in the second array like pattern align with a corresponding one of the threaded flange apertures of the first array like pattern whereby the first and second array like patterns are complementary. The fastening means comprises a plurality of bolting connections, one for each aligned hub aperture and threaded flange aperture, for securing the plurality of blades to the hollow hub. Each bolting connection has a bolt head-like portion located within the central opening of the hollow hub and has a threaded shaft portion extending through a corresponding aligned hub aperture and threaded flange aperture for threading engagement with the threaded flange aperture.

BRIEF DESCRIPTION OF THE DRAWINGS

For a better understanding of the nature and objects of the present invention reference may be had to the following detailed description when taken in conjunction with the accompanying diagrammatic drawings in which.

DETAILED DESCRIPTION OF THE INVENTION

Figure 1:
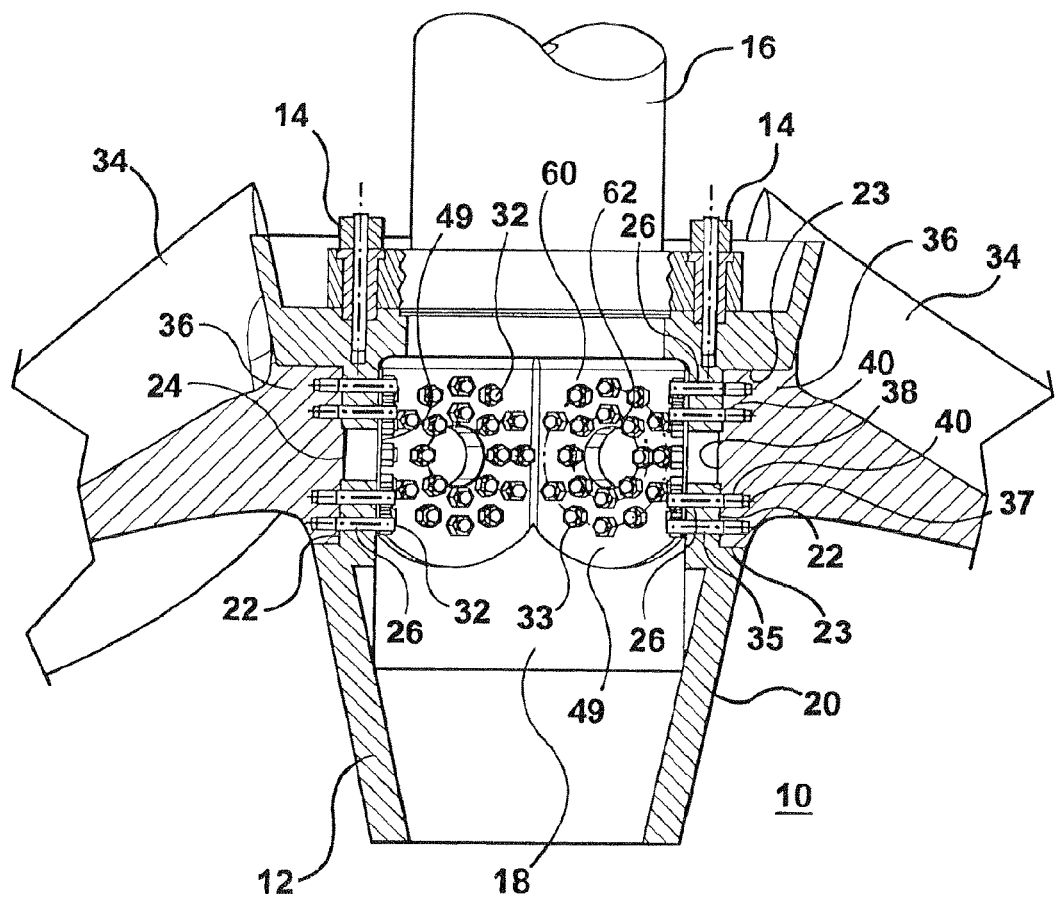
FIG. 1 is a sectional assembly view of the turbine runner hub and runner blades.
Figure 2:
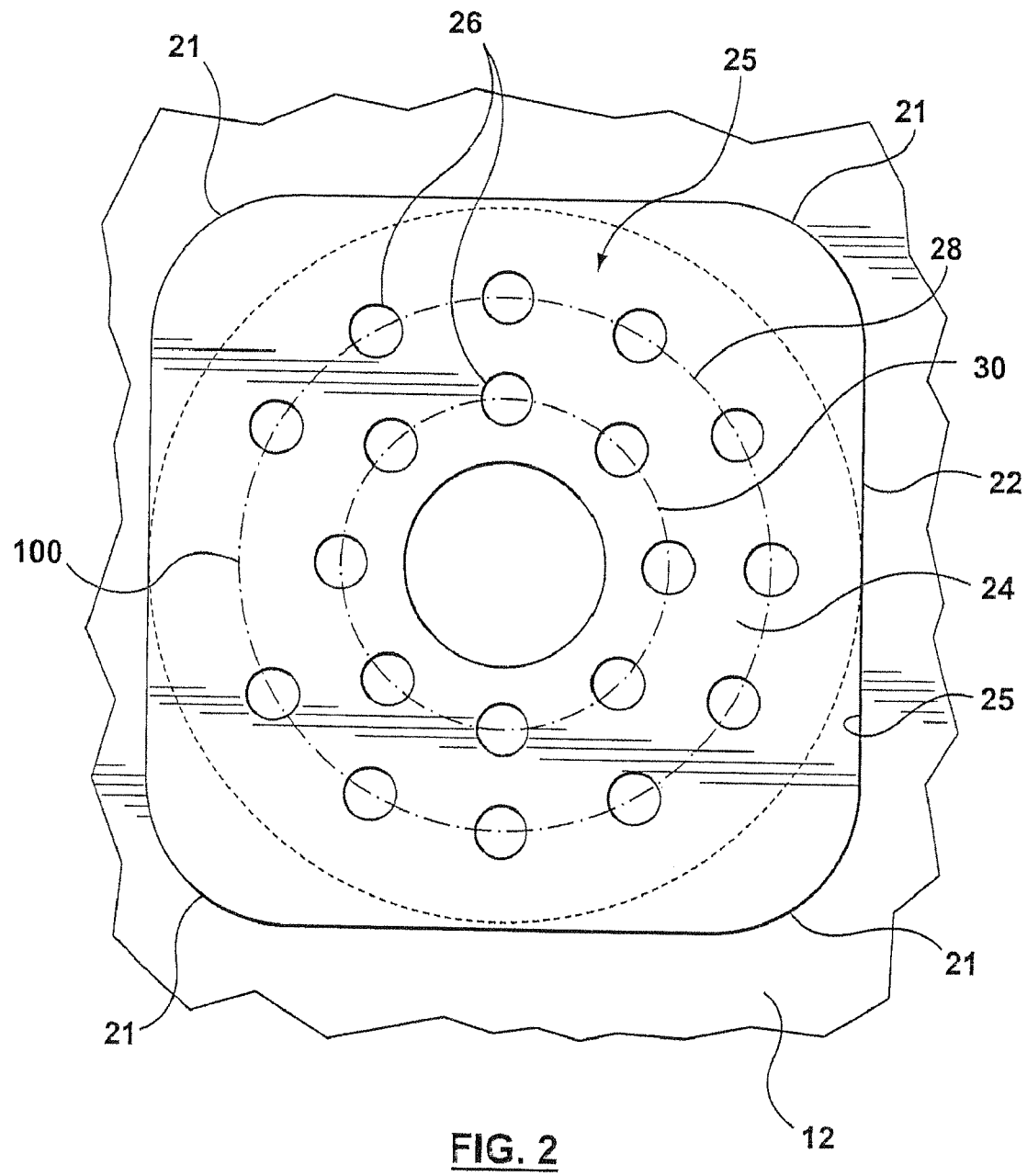
FIG. 2 is a front view of a portion of the outer surface portion of the hub of the turbine.

Referring to the Figures, the present invention relates to a hydraulic turbine 10 having runner blades 34 assembled to a hollow runner hub 12 for a fixed blade axial flow turbine. In the figures shown, the blades 34 form part of a diagonal turbine runner. It should be understood that the fixed blades 34 may form part of a propeller turbine runner (not shown). The hub 12 is connected by studs and nuts 14 to a prime mover or shaft 16. The hub 12 has a central opening 18 and a non-planar outer surface portion 20 that is generally conical, in shape and may be cylindrical or spherical depending on the turbine design. The hub 12 comprises a plurality of recesses 22, one for each blade 34, which recesses 22 are machined into the surface 20 of the hub 12 and define a protruding lip 25 that at least partially, if not fully, surrounds the recess 22.

Figure 3:
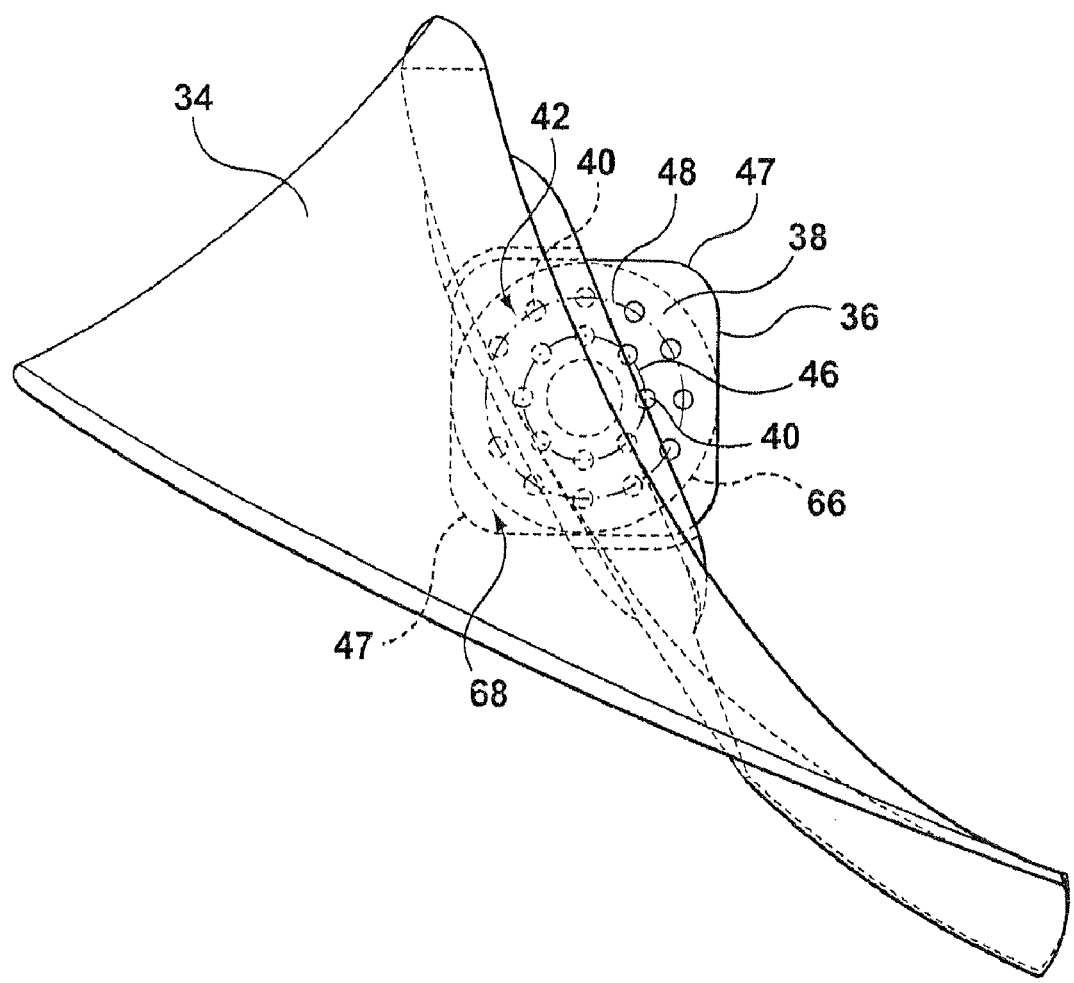
FIG. 3 is an isometric view of one of the turbine blades.
Figure 4:
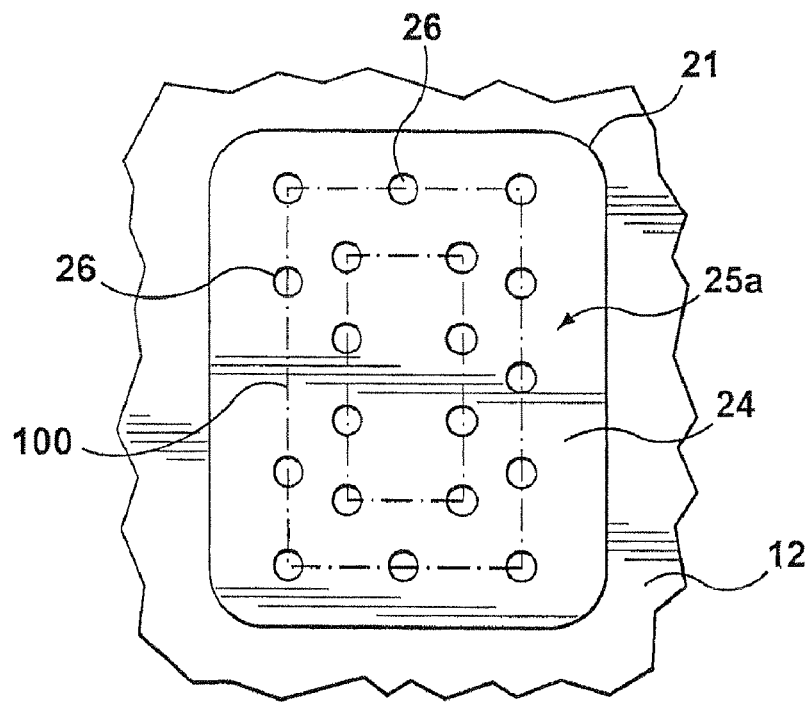
FIGS. 4 and 5 illustrate alternative aperture patterns.
Figure 5:
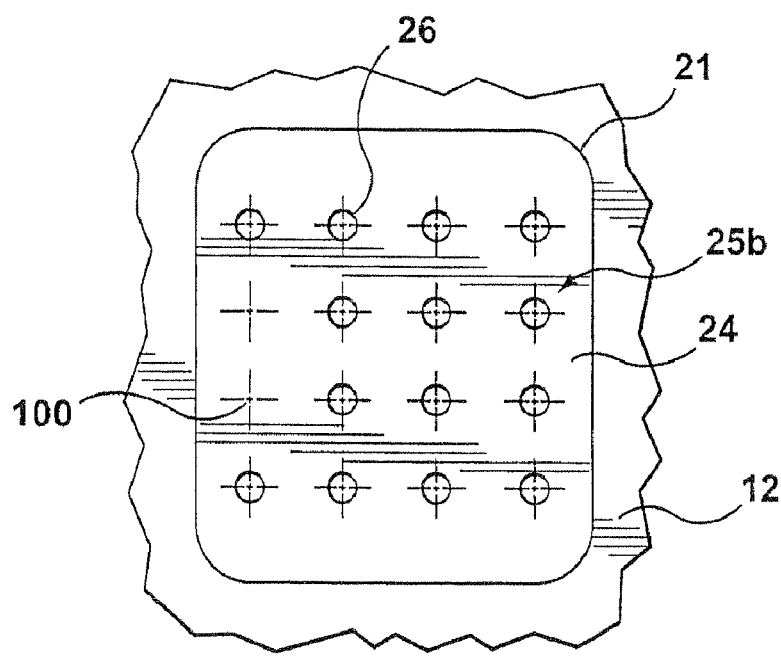

Referring to FIGS. 1 and 3, the hub mounting flange 36 of the runner blade 34 comprises a planar hub abutting surface portion 38 having a generally rectangular shape in the form of a square machined with a small radius corners 47. The shape of the flange seating surface portion 24 and that of the hub abutting surface portion 38 are preferably complementary to each other so as to provide for good seating of the mounting flange 36 within the recess 22 with the lip 23 of the recess 22 at least partially surrounding sides of the mounting flange 36. The runner blades 34 comprise a plurality of threaded flange apertures 40 formed by drilling, reaming and tapping to final size. The threaded apertures 40 extend from the hub abutting surface portion 38 into mounting flange 36 of the runner blade 34. The plurality of threaded flange apertures 40 are grouped and spread across the hub abutting surface portion 38 in an array-like pattern 42 of two concentric circular or array patterns 46, 48 (FIG. 3). The array-like pattern 25 of the hub apertures 26 is arranged to align with array-like pattern 42 of the corresponding threaded flange apertures 40. It should be understood that if the array-like patterns 25a and 25b of FIGS. 4 and 5 for the hub apertures 26 are used, then complementary array-like patterns (not shown) would be found on the hub abutting surface portion 38 for the threaded flange apertures 40.

Referring to FIGS. 1 and 3, the hub mounting flange 36 of the runner blade 34 comprises a planar hub abutting surface portion 38 having a generally rectangular shape in the form of a square machined with a small radius corners 47. The shape of the flange seating surface portion 24 and that of the hub abutting surface portion 38 are preferably complementary to each other so as to provide for good seating of the mounting flange 36 within the recess 22 with the lip 23 of the recess 22 at least partially surrounding sides of the mounting flange 36. The runner blades 34 comprise a plurality of threaded flange apertures 40 formed by drilling, reaming and tapping to final size. The threaded apertures 40 extend from the hub abutting surface portion 38 into mounting flange 36 of the runner blade 34. The plurality of threaded flange apertures 40 are grouped and spread across the hub abutting surface portion 38 in an array-like pattern 42 of two concentric circular or array patterns 46, 48 (FIG. 3). The array-like pattern 25 of the hub apertures 26 is arranged to align with array-like pattern 42 of the corresponding threaded flange apertures 40. It should be understood that if the array-like patterns 25a and 25b of FIGS. 4 and 5 for the hub apertures 26 are used, then complementary array-like patterns (not shown) would be found on the hub abutting surface portion 38 for the threaded flange apertures 40.

As shown in FIG. 1, the inner surface of the hub 12 is provided with relatively flat surface portions 49 which are surfaces located on the opposite side of the planar flange seating surface portion 24 of the recess 22.

Bolting connections 32 shown in FIG. 1 pass through a corresponding aligned hub apertures 26 and threaded flange apertures 40 so as to secure the runner blades 34 to the hub 12. Each bolting connection 32 has a bolt head portion or nut 33 that is located within the central opening 18 of the hollow hub 12 and is tightened against a flat surface portion 49. Each bolting connection 32 has a stud 37 with threaded shaft portion 35 that extends through a corresponding aligned aperture 26 and into threaded flange aperture 40 for threading engagement with the threaded flange aperture 40. The threaded shaft portion 35 of the stud 37 may be continuous or have a middle portion not threaded allowing a wrench to be used against the non threaded portion to secure the stud 37 into the threaded aperture 40 of flange 36. Otherwise two nuts can be threaded onto the stud together, locked and temporarily used to secure the studs 37 in the flange 36. As shown in FIG. 1, the bolting connections 32 are arranged in two concentric circular patterns 60, 62 for each blade 34. Other array bolting patterns may be used which would correspond to patterns shown in FIGS. 4 and 5.

In some instances, due to space limitations inside of the hub 12, there may be insufficient area for a bolting connections 32 to be used where adjacent flat surface portions 49 meet. Accordingly, no bolting connection 32 is used and associated apertures through the hub 12 and into the mounting flange 36 are not required leading to the aperture patterns through the hub 12 and into the flange 36 being incomplete.

The generally square shape of the planar hub abutting surface portion 38 and the complementary square shape of the planar flange seating surface portion 24 allow for additional bolts, if required, to be passed through apertures (not shown) located in the corners or adjacent to the corners 21 and 47 respectively of the flange seating surface portion 24 and the hub abutting surface portion 38.

The nuts 33 and studs 37 are installed from inside the hollow hub 12. Tightening of the nuts 33 or stud 37 brings the planar hub abutting surface 38 of the mounting flange 36 into direct flat abutting contact with the planar flange seating surface portion 24 of the recess 22. The nuts 33 are tightened such that the contact pressure between the mounting flange 36 of the runner blades 34 and the recess 22 of the hollow hub 12 is a predetermined force leading to the highest forces in moments occurring on the bolting connections 32 in the two concentric bolting circles 60, 62 to prevent face separation. Blade angle is not adjustable.

Referring to FIG. 3, a circle 66 is shown in broken line. Circle 66 represents the area of the prior circular flange as compared to the larger area of the generally square shape of the hub mounting flange 36. The increased surface area provided by the square rectangular shape of mounting flange 36 of FIG. 3 is shown in the corner areas as 68. It should be understood that if the rectangular shape shown in FIG. 3 had a height twice that of its width, then additional surface area above and below circle 66, and not just in the corners, would be present.

While the invention has been described in terms of very specific embodiments, those skilled in the art will recognize that the invention can be practiced with modification that fall within scope of the appended claims.

What is claimed is:

1. An axial flow hydraulic turbine with fixed blade mounting comprising:
   a plurality of runner blades, each of the runner blades includes a blade portion and a mounting flange, wherein a base of the blade portion joins or abuts the mounting flange, the base forms an oblique angle with an axis of the turbine, and the mounting flange includes a planar hub abutting surface portion;
   a hub for supporting the runner blades, the hub comprising a non-planar, annular outer surface having a plurality of recesses, each of the recesses corresponds to one of the plurality of runner blades, each of the recesses having a planar flange seating surface portion for seating the planar hub abutting surface portion of the mounting flange of the runner blade corresponding to the recess, wherein the outer surface of the hub at the plurality of recesses is tapered with respect to the axis of the turbine to converge radially inwardly in a direction of water flow through the hydraulic turbine; and
   a fastener attaching in a fixed position each of the runner blades to the hub where each hub mounting flange meets the hub.

2. The axial flow hydraulic turbine of claim 1 wherein the planar flange seating surface portion of each of the recesses is shaped to be complementary to the hub abutting surface portion.

3. The axial flow hydraulic turbine of claim 2 wherein the curved sections each have a common radius.

4. The axial flow hydraulic turbine of claim 3 wherein the planar hub abutting surface portion for each of the runner blades has a generally rectangular perimeter with curved corners.

5. The axial flow hydraulic turbine of claim 1 wherein the planar hub abutting surface portion of each of the runner blades has a perimeter including straight edges.

6. The axial flow hydraulic turbine of claim 5 wherein the perimeter of the planar hub abutting surface portion corresponds to a perimeter of the corresponding planar hub abutting surface portion.

7. The axial flow hydraulic turbine of claim 1 wherein the plurality of recesses are machined into the non-planar outer surface of the hub and form lips that each at least partially surround a corresponding recess.

8. The axial flow hydraulic turbine of claim 1 wherein:
   the mounting flange comprises a plurality of threaded flange apertures extending from the planar hub abutting surface portion into the mounting flange, the plurality of threaded flange apertures being grouped and spread across the planar hub abutting surface portion in a first array and the perimeter of the mounting flange being non-circular;
   the hub is hollow and comprises a central opening, each of the recesses having a flange seating surface portion for seating a corresponding planar hub abutting surface portion of the mounting flange, and the recesses each include a plurality of hub apertures extending from the planar flange seating surface portion through the hollow hub and opening into the central opening, the plurality of hub apertures being grouped and spread across the planar flange seating surface portion in a second array like pattern, each of the hub apertures in the second array like pattern aligning with a corresponding one of the threaded flange apertures of the first array like pattern; whereby the first and second array like patterns are complementary; and
   wherein the fastener comprises a plurality of bolting connections, one for each aligned hub aperture and threaded flange aperture, for securing the plurality of blades to the hollow hub, each bolting connection having a bolt head-like portion located within the central opening of the hollow hub and having a threaded shaft portion extending through a corresponding aligned hub aperture and threaded flange aperture for threading engagement with the threaded flange aperture.

9. The axial flow hydraulic turbine of claim 8 wherein each of the bolting connections comprises a stud comprising the threaded shaft portion and a nut comprising the bolt head-like portion rotated onto an end of the stud passing into the central opening of the hollow hub.

10. The axial flow hydraulic turbine of claim 8 wherein the first array like pattern and the second array like pattern each comprise one pattern chosen from the group consisting of: two concentric circular patterns, an matrix array pattern, and two concentric rectangular patterns.

11. The axial flow hydraulic turbine of claim 10 wherein the first and second array like patterns comprise incomplete patterns.

12. The axial flow hydraulic turbine of claim 11 wherein each of the bolting connections comprises a stud comprising the threaded shaft portion and a nut comprising the bolt head-like portion rotated onto an end of the stud passing into the central opening of the hollow hub.

\* \* \* \* \*